Patented May 3, 1949

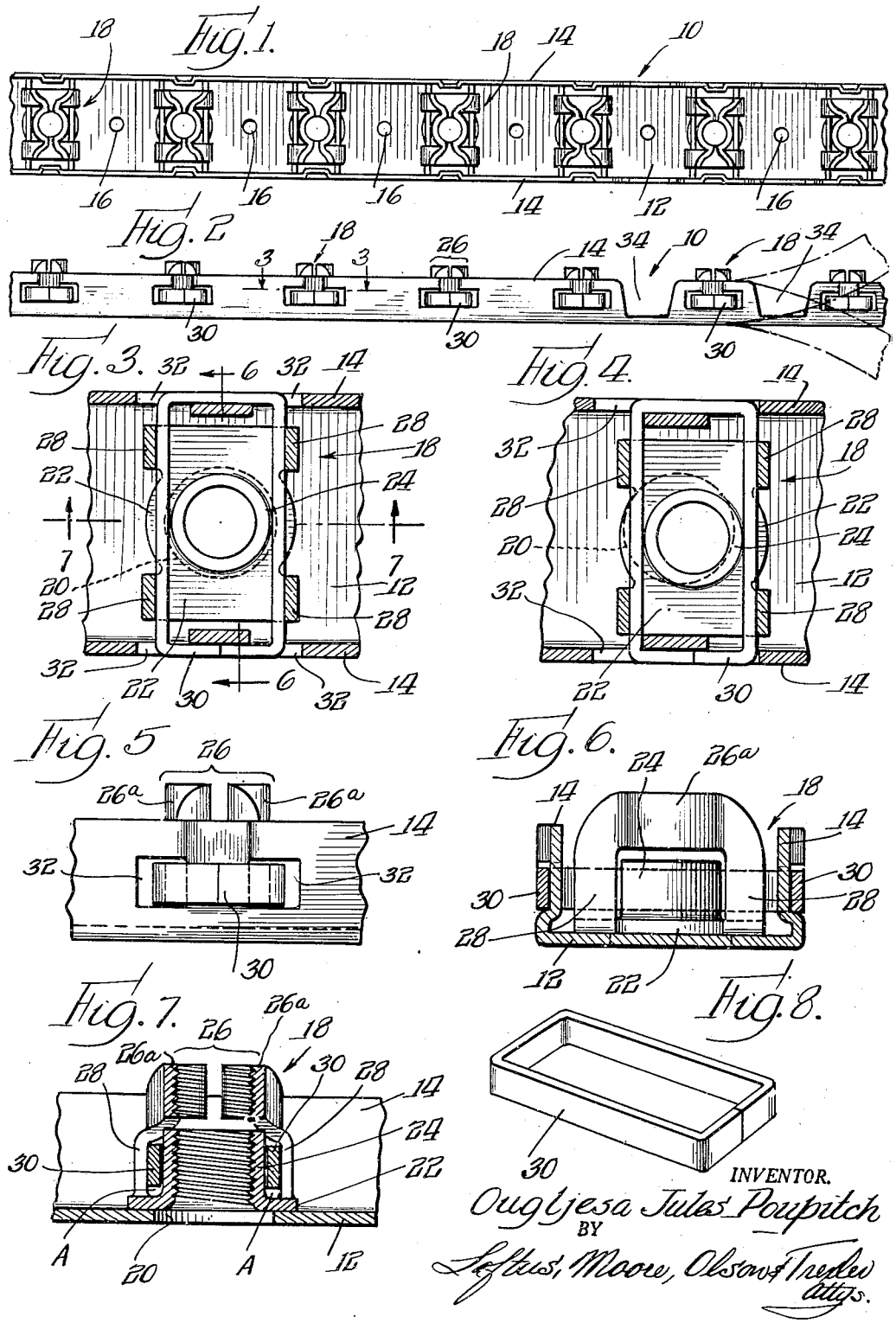

2,469,312

UNITED STATES PATENT OFFICE 2,469,312

SCREW LOCKING DEVICE

Ougljesa Jules Poupitch, Chicago, Ill., assignor to Illinois Tool Works, Chicago, Ill., a corporation of Illinois Application March 22, 1945, Serial No. 584,100

4 Claims. (Cl. 85—32)

This invention relates generally to locking devices for screws but more particularly to locking devices wherein a lock nut is shiftably movable within given limits upon a supporting plate to facilitate initial application of a screw member to the plate.

The present invention contemplates a locking device in which a sheet metal base such for example as an elongated metal strip is equipped with a lock nut mounted in a novel and practical manner for limited shifting upon the strip. More specifically the invention contemplates a device wherein the lock nuts are preferably of sheet metal construction so formed as to provide for convenient reception of simple yet strong anchoring members which will prevent separation of the nuts from the sheet metal plate or strip and at the same time will permit the required degree of limited shifting in any direction along the surface of the plate.

Still more specifically it is contemplated to provide in association with a sheet metal plate having oppositely disposed flanges, a sheet metal nut which may be permanently yet shiftably held upon the plate by the use of a simple locking anchoring member extending from one flange to another in superimposed relation with respect to a base portion of the sheet metal nut and between resilient arms of the nut.

The foregoing and other objects will be more apparent from the following detailed description when considered in connection with the accompanying drawings wherein:

Fig. 1 is a plane view of a fastener strip constructed in accordance with the teachings of the present invention;

Fig. 2 is a front elevational view of the device illustrated in Fig. 1;

Fig. 3 is an enlarged plane sectional view taken substantially along the line 3—3 of Fig. 2 disclosing the lock nut in registration with the aperture in the supporting plate or strip;

Fig. 4 is a view similar to Fig. 3 disclosing the nut shifted to a position of eccentricity with respect to the aperture in the supporting plate;

Fig. 5 is a front elevational view of the device illustrated in Fig. 3;

Fig. 6 is a transverse vertical sectional view taken substantially along the line 6—6 of Fig. 3;

Fig. 7 is a vertical sectional view taken substantially along the line 7—7 of Fig. 3; and Fig. 8 is a perspective view of a detached nut anchoring member.

Referring now to the drawings wherein like numerals have been employed to designate various parts throughout the various figures it will be seen that one embodiment of the present invention comprises a fastener strip designated generally by the numeral 10, Figs. 1 and 2. This fastener device or strip includes an elongated plate 12 provided with integral flanges 14 extending laterally of the plate or strip 12 from opposite sides thereof. The plate 12 is provided with a plurality of spaced apertures 16 which are arranged to accommodate fastening elements such as screws for securing the strip in any desired position.

The plate 12 serves as a support for a plurality of lock nuts designated generally by the numeral 18. These lock nuts 18 may be spaced along the plate 12 in any desired relation depending upon the needs incident to their use. For each lock nut, the plate 12 is provided with an aperture 20, best illustrated in Fig. 7, to permit the insertion of a screw member into operative association with a companion lock nut. The invention contemplates an improved arrangement whereby these lock nuts 18 may be loosely anchored in spaced relation along the plate or strip 12. The manner in which these nuts are so mounted may best be understood by first describing some of the structural details of the nuts.

These nuts 18 are preferably formed from sheet metal stock, each lock nut including a base portion 22 and an internally threaded annular section 24 extending laterally of the base. It has been found practical to form the internally threaded section 24 extruding the material of the sheet stock. The lock nut includes a split threaded section indicated generally by the numerals 26 within the bracket of Fig. 5. This locking or split threaded section 26 is comprised of two oppositely disposed identical parts 26a which are supported from the base portion 22 by resilient arms 28. The symmetrical locking parts 26a are segmental or arcuate in form and disposed in adjacent superimposed relation with the internally threaded extrusion 24. The resilient supporting arms 28 are joined at their lower extremities with the base portion 22. Two of the arms 28 are positioned on one side of the base portion 22 and a similar pair are disposed in opposite relation. Toward their upper extremities their arms are bent inwardly as clearly illustrated in Fig. 7. Thus, when the nut is viewed as shown in Fig. 7 it will be apparent that the arms 28, the base portion 22 and the extrusion 24 cooperate to present a rectangularly shaped opening indicated by the letters A in which an anchoring member or strip 30 may be located in a manner about to be described. By having a pair of arms on each side of the base portion 22 as described, the desired degree of resiliency for screw locking purposes is obtained. In this connection it will be obvious that the inner surface area of each segmental part 26a is threaded to conform with the threads in the extrusion 24. However, the threaded sections in the parts 26a are normally positioned closer to the axis of the nut than the thread convolutions of the extrusion 24 so that when a screw is inserted from the under side of the nut through the supporting aperture 20 in the supporting plate 12 it eventually contacts the inwardly positioned thread sections of the segmental parts 26a. Thus these parts will be sprung outwardly as the entering end of the screw rises from the extrusion 24 into concentric alignment with the threaded convolutions of the extrusion. The resilient gripping of the locking section 26 serves to effectively counteract unintentional retrograde rotation of a screw member.

As previously stated, the invention contemplates a locking arrangement wherein the lock nut may be shiftable within certain limits so as to facilitate registration of the internally threaded extrusion 24 and a screw member introduced within the plate aperture 20. This is accomplished by a very simple yet significantly practical structural arrangement. As previously stated a locking member or strip 30 is adapted to be positioned within the opening A of the lock nut as illustrated in Fig. 7. This anchoring member or strip 30 when finally secured in position is in the form of a circuitous cage preferably of the rectangular form illustrated in Fig. 8. The parallel elongated sides of the member 30 are adapted to be inserted through complementary apertures 32 provided in the flanges 14, these apertures forming the intermediate strap portions embraced by the adjacent parts of the cage. The width of the rectangle formed by the staple-like member 30 is substantially the same as the distance between oppositely disposed arms 28, and the free extremities of the staple legs are bent into abutting relation after they have been completely inserted. Sufficient clearance is provided by the apertures 32 to permit limited movement longitudinally of the plate or strip 12 as clearly illustrated in the two positions of Figs. 3 and 4. In Fig. 3 the anchoring member 30 is positioned centrally so that the entire nut structure may be shifted either to the left or to the right. Fig. 4 illustrates the position occupied by the nut when it is shifted to its extreme right position. It will also be noted that the distance between the flanges 14 is sufficiently greater than the length of the base portion 22 to permit limited nut movement transversely of the strip 12. In Fig. 3 the nut is shown in a medial position whereas in Fig. 4 the nut has been shifted laterally from the position shown in Fig. 3. From the foregoing it will be apparent that linear shifting of the nut in opposite directions both longitudinally and transversely of the strip is made possible by the structure just described.

The importance of providing the opening A for receiving opposite legs of the anchoring member or strip 30 will now be apparent. In Figs. 3 and 4 it will be noted that one side of each leg of the anchoring member is bounded by the inner surface of one pair of resilient arms 28 and the other side of the leg is bounded by the peripheral surface of the extrusion 24. Hence the nut 18 is coupled as a unit with the anchoring member 30 in shifting longitudinally of the strip while the nut is free to shift along the legs of the anchoring member transversely of the strip within the specified limits. This provides for a very practical, sturdy, floating nut arrangement which permits the nut to be shifted in any direction within predetermined limits to facilitate initial registration of a screw member with the nut. In order to maintain flush relation along the outer sides of the flanges 14 the portion of the stock positioned inside of each end of the anchoring member are preferably positioned inwardly of the plane of the flanges, see Figs. 3 and 4. If these portions of stock positioned between the companion apertures 32 were not depressed inwardly the anchoring strip 30 would obviously extend beyond the outer surface of the flanges 14, at least to the extent of the thickness of the stock from which the anchoring strip is formed.

It will be apparent from the foregoing description that the invention contemplates a locking device for screws which may be very economically produced but which will serve to permanently retain a plurality of lock nuts along a metallic strip, providing the required degree of limited movement along the supporting plate to facilitate the reception of screw members. By having the resilient or spring arms extending from the base portion it is possible to permanently secure the nuts in position by means of simple strips—like anchoring members. Obviously the invention is not limited for use with supporting plates having continuous flanges along opposite sides thereof. In fact the material of the flange may be cut away at 34, as indicated in Fig. 2 without destroying the holding power of the anchoring member. With the material of the flange thus removed the strip may be bent or flexed to accommodate itself to surfaces other than flat surfaces. Dot and dash lines of Fig. 2 indicate how the strip may be bent upwardly or downwardly. By having the elongated nut anchoring members or staples extending between the resilient arms as disclosed, with the nut locking section superimposing the annular extrusion or section of the base portion, the lock nut is securely yet shiftably anchored to the supporting plate or strip.

For purposes of illustration certain structural features and embodiments have been illustrated. However, it will be understood that modifications and changes may be made without departing from the spirit and scope of the appended claims.

I claim:

1. A locking device for screws comprising an apertured nut supporting plate, flanges extending laterally from opposite sides of said plate and including opposed lateral strap portions, a nut member transversely shorter than the distance between said flanges and supported by said plate for permissive relative movement between the said flanges, said nut member including a base, side members projecting laterally from the opposite edges of said base, nut anchoring means comprising a circuitous cage member having a pair of oppositely positioned parallel lengths longitudinally longer than the width of said strap portions and slidably embracing the outer surfaces thereof, and a pair of oppositely positioned interconnecting parallel lengths traversing said plate and slidably embraced by the inner surfaces of said side members whereby said nut member may be guidingly shifted rectilinearly within given limits along intersecting lines of direction, a portion of said flange overlying the first mentioned lengths of said cage member for retaining the said cage member in operative position.

2. A locking device for screws as set forth in claim 1, wherein the circuitous cage member defines a rectangular parallelogram as viewed axially of the nut member.

3. A locking device for screws as set forth in claim 1, wherein the strap portions are offset inwardly with respect to the remaining portion of the flanges a distance which is at least equal to the thickness of the lengths of said cage member embracing said strap portions.

4. A locking device for screws as set forth in claim 1, wherein each flange is provided with apertures on each side of said strap portions through which the second mentioned interconnecting parallel lengths extend, said apertures being sufficiently elongated to permit movement of said cage member longitudinally of said supporting plate.

OUGLJESA JULES POUPITCH.

REFERENCES CITED

The following references are of record in the file of this patent:

UNITED STATES PATENTS

| Number | Name | Date |
|---|---|---|
| 2,144,553 | Simmonds | Jan. 17, 1939 |
| 2,255,650 | Burke | Sept. 9, 1941 |
| 2,303,148 | Tinnerman | Nov. 24, 1942 |
| 2,314,756 | Bedford | Mar. 23, 1943 |
| 2,333,386 | Murphy | Nov. 2, 1943 |
| 2,335,593 | Howe | Nov. 30, 1943 |
| 2,395,142 | Poupitch | Feb. 19, 1946 |

FOREIGN PATENTS

| Number | Country | Date |
|---|---|---|
| 527,340 | Great Britain | Oct. 7, 1940 |